(12) United States Patent
Kani et al.

(10) Patent No.: US 8,603,636 B2
(45) Date of Patent: Dec. 10, 2013

(54) POLYLACTIC ACID-BASED DECORATIVE BODY

(75) Inventors: Satoru Kani, Tokyo (JP); Yukihiro Kiuchi, Tokyo (JP)

(73) Assignees: Origin Electric Company, Limited, Tokyo (JP); NEC Corporation, Tokyo (JP)

( * ) Notice: Subject to any disclaimer, the term of this patent is extended or adjusted under 35 U.S.C. 154(b) by 76 days.

(21) Appl. No.: 13/500,556

(22) PCT Filed: Oct. 4, 2010

(86) PCT No.: PCT/JP2010/067395

§ 371 (c)(1),
(2), (4) Date: Apr. 5, 2012

(87) PCT Pub. No.: WO2011/046037

PCT Pub. Date: Apr. 21, 2011

(65) Prior Publication Data

US 2012/0196132 A1    Aug. 2, 2012

(30) Foreign Application Priority Data

Oct. 14, 2009    (JP) ................................. 2009-237367

(51) Int. Cl.
*B32B 27/40* (2006.01)
*B32B 27/30* (2006.01)

(52) U.S. Cl.
USPC ..................... 428/423.1; 428/532; 428/542.2

(58) Field of Classification Search
USPC ................................... 428/423.1, 532, 542.2
See application file for complete search history.

(56) References Cited

FOREIGN PATENT DOCUMENTS

| JP | 55-000702 | 1/1980 | | |
|----|-----------|--------|---|---|
| JP | 09-302309 | 11/1997 | | |
| JP | 2004-231797 | 8/2004 | | |
| JP | 2006-212546 | 8/2006 | | |
| JP | 2006-291000 | 10/2006 | | |
| JP | 2008073998 A | * | 4/2008 | ............. B23B 27/40 |
| JP | 2008-150560 | 7/2008 | | |
| JP | 2008-239830 | 10/2008 | | |
| JP | 2009-052008 | 3/2009 | | |

OTHER PUBLICATIONS

International Preliminary Report on Patentability dated Apr. 26, 2012 for corresponding PCT/JP2010/067395 with English translation.
International Search Report and Written Opinion dated Jan. 11, 2011 for corresponding International Patent Application No. PCT/JP2010/067395 (with English translation).

* cited by examiner

*Primary Examiner* — Thao T. Tran
(74) *Attorney, Agent, or Firm* — Ohlandt Greeley Ruggiero & Perle L.L.P.

(57) ABSTRACT

A polylactic acid-based decorative body including a polylactic acid resin-containing substrate, a polylactic acid resin-containing adhesion layer provided on the substrate, and at least one functional layer that is formed on the adhesion layer by applying an acrylic urethane coating composition, wherein in the acrylic urethane coating composition, the molar ratio of OH groups in an acrylic resin to NCO groups in a polyfunctional isocyanate is 1:4 to 1:6.

5 Claims, No Drawings

POLYLACTIC ACID-BASED DECORATIVE BODY

BACKGROUND

1. Field of the Disclosure

The present disclosure relates to a polylactic acid-based decorative body that satisfies the performance requirements of electronic equipment cases.

2. Background Art

In recent years, from the standpoint of environmental protection, studies have been made on the reduction of the use of petroleum-derived materials and on alternative use of plant-derived materials.

Examples of petroleum-derived materials include synthetic resins such as polycarbonate resins, polycarbonate resins/acrylonitrile-butadiene-styrene copolymers (PC/ABS), and aromatic nylons. These have advantages such as lightweight, high strength, and long life and are used in various fields. However, these have the problem of high environmental loading, because when incinerated, these produce intense heat to cause damage to incinerators and release a large amount of carbon dioxide. When disposed by landfill, these cause lack of disposal site or landfill, because these have high volume occupancy and are not degradable in the soil. Also when dissipated into the natural world, these have an adverse effect on wild animals and so on to cause the problem of environmental destruction. The raw material petroleum is a resource whose reserves are limited, and therefore, plant-derived plastic materials have been studied as alternative materials.

Among plant-derived plastic materials, particularly, polylactic acid resin, which is made from plants such as corn and sweet potato, undergoes hydrolysis in the soil to be reduced in molecular weight and is finally decomposed into carbon dioxide and water by microorganisms. Polylactic acid resin is also characterized in that when it is incinerated, the amount of heat generation is relatively small, and the amount of carbon dioxide release is also relatively small. In addition, polylactic acid resin has been attracting attention as a low-environmental-loading material, because the raw material plants absorb carbon dioxide in the course of their growth.

Polylactic acid resin also has characteristics such as high rigidity, relatively high tensile strength, and high transparency, and molded products thereof have begun to be applied in various fields such as food containers, horticultural sheets, electronic equipment cases, and automobile parts (see for example Patent Document 1). There are many examples in which synthetic resin coating compositions containing synthetic resin such as acrylic resin or urethane resin are applied to the surface of molded synthetic resin products so that surface conditions such as esthetic appearance and protection against scratches are improved. Also for molded products of polylactic acid resin, coating compositions for adding some functions have been aggressively developed, and there have been proposed a pressure-sensitive adhesive (see for example Patent Document 2) and a coating agent (see for example Patent Document 3) each having good adhesion to a polylactic acid resin substrate.

3. Discussion of the Background Art

Patent Document 1: Japanese Patent Application Laid-Open (JP-A) No. 2008-150560, paragraph 0029

Patent Document 2: JP-A No. 2004-231797

Patent Document 3: JP-A No. 2006-291000

However, polylactic acid resin tends to be inferior in heat resistance, impact resistance, chemical resistance, and weather resistance to synthetic resin particularly for use in durable consumer goods. Under wet and hot conditions, polylactic acid resin is also reduced in molecular weight by hydrolysis, so that its strength is reduced, and therefore, the development of the application of polylactic acid resin alone is restricted. For example, when it is used for electronic equipment cases such as cases of personal computers and cellular phones, not only it should withstand long-term use, but also it should satisfy heat resistance, impact resistance, water resistance, chemical resistance, and surface performance requirements. In addition, molded products of polylactic acid resin may be deformed by heat generated from electronic equipments, or their surface may be affected and deteriorated by sweat, hand cream, or the like on the hand of the user, and therefore, solutions to these problems are necessary.

Patent Document 1 proposes a polylactic acid-based resin composition that is produced by adding a flame retardant to polylactic acid resin and can be used as an industrial material, but it does not solve the problem of high hydrolyzability which is a disadvantage of polylactic acid resin. Moreover, the inventors have tried to improve hydrolysis resistance by forming a coating film on the surface of a polylactic acid resin-containing substrate. The results have shown that conventional synthetic resin coating compositions comprising petroleum-derived materials have insufficient adhesion to substrates and that polylactic acid resin coating agents such as those disclosed in Patent Document 3 cannot solve the problem of high hydrolyzability although they have good adhesion to substrates, so that the performance requirements of electronic equipment cases cannot be satisfied using the existing coating compositions.

SUMMARY

To solve the problems, an object of the present disclosure is to provide a polylactic acid-based decorative body that is polylactic acid resin-based and has a synthetic resin coating film at the uppermost layer so that: the disadvantage of polylactic acid-based decorative bodies can be compensated for; environmental loading can be reduced; a good appearance can be provided; its surface can be prevented from being affected or deteriorated by sweat, hand cream, or the like on the hand of the user; and it can be used in electronic equipment cases.

As a result of earnest studies to solve the above problems, the inventors have accomplished the present disclosure based on the finding that a process including: applying, onto a polylactic acid resin-containing substrate, a primer having good adhesion to both polylactic acid resin and synthetic resin; and overcoating the primer with a synthetic resin coating composition makes it possible to obtain a polylactic acid-based decorative body that satisfies the performance requirements of electronic equipment cases such as cases of personal computers and cellular phones. Thus, the present disclosure is directed to a polylactic acid-based decorative body, including: a polylactic acid resin-containing substrate; a polylactic acid resin-containing adhesion layer provided on the substrate; and at least one functional layer that is formed on the adhesion layer by applying an acrylic urethane coating composition, wherein the acrylic urethane coating composition forms a coating film by causing a condensation reaction of an acrylic resin with a polyfunctional isocyanate, and the molar ratio of OH groups in the acrylic resin to NCO groups in the polyfunctional isocyanate is 1:4 to 1:6.

In the polylactic acid-based decorative body according to the present disclosure, the acrylic urethane coating composition is preferably a synthetic resin coating composition including an acrylic resin, a polyfunctional isocyanate, and a liquid solvent free of both toluene and xylene. The synthetic resin coating composition free of both toluene and xylene can further reduce environmental loading.

In the polylactic acid-based decorative body according to the present disclosure, the adhesion layer preferably includes a polylactic acid resin, a naturally-occurring tackifying resin, an anti-hydrolysis agent, and a polyfunctional isocyanate as coating components. According to this feature, the adhesion layer has good adhesion to the substrate and well adheres to the functional layer as an overcoat, so that more reliable performance can be achieved for electronic equipment case applications.

In the polylactic acid-based decorative body according to the present disclosure, the adhesion layer preferably contains at least one of a pigment, an inorganic filler, and a glitter. By including at least one of these additives, the adhesion layer can be provided with design features, and the strength of the coating film can be increased.

In the polylactic acid-based decorative body according to the present disclosure, the weight content of a plant-derived component(s) in the substrate is preferably from 25% by weight to 100% by weight. According to this feature, a reduction in environmental loading which is an object of the present disclosure can be achieved.

According to the present disclosure, the formation of a synthetic resin coating film at the uppermost layer of a polylactic acid resin-based decorative body makes it possible to provide a polylactic acid-based decorative body that can compensate for the disadvantage of polylactic acid resin, can reduce environmental loading, has a good appearance, has a surface that is prevented from being affected or deteriorated by sweat, hand cream, or the like on the hand of the user, and can be used in electronic equipment cases.

DETAILED DESCRIPTION OF THE PREFERRED EMBODIMENT

The present disclosure will be described in detail with reference to certain embodiments, which are not intended to limit the scope of the present disclosure. The embodiments may also be modified as long as the effects of the present disclosure can be produced.

A polylactic acid-based decorative body according to a present embodiment includes: a polylactic acid resin-containing substrate; a polylactic acid resin-containing adhesion layer provided on the substrate; and at least one functional layer that is formed on the adhesion layer by applying an acrylic urethane coating composition, wherein the acrylic urethane coating composition forms a coating film by causing a condensation reaction of an acrylic resin with a polyfunctional isocyanate, and the molar ratio of OH groups in the acrylic resin to NCO groups in the polyfunctional isocyanate is 1:4 to 1:6.

Besides the polylactic acid resin, the substrate may contain a filler, a pigment, a heat stabilizer, an antioxidant, an anti-weathering agent, a plasticizer, a lubricant, a release agent, an antistatic agent, a filling material, a crystal nucleating agent, a flame retardant, an anti-hydrolysis agent, or the like.

The polylactic acid resin contained in the substrate is a resin including polylactic acid as a main component. In the present embodiment, poly-L-lactic acid, poly-D-lactic acid, or a mixture or copolymer thereof is preferably used as a component of the polylactic acid resin, while the components of the polylactic acid resin are not restricted. Particularly in view of heat resistance, the polylactic acid resin has a weight ratio of crystalline polylactic acid with an optical purity of 90% or more to polylactic acid with an optical purity of less than 90% (crystalline polylactic acid with an optical purity of 90% or more/polylactic acid with an optical purity of less than 90%) of 100/0 to 10/90, preferably 100/0 to 25/75, more preferably 100/0 to 50/50, even more preferably 100/0 to 90/10.

The polylactic acid resin contained in the substrate also preferably has a polystyrene-equivalent weight average molecular weight (Mw) of 2,000 to 200,000.

For example, the filler may be a metal oxide such as magnesium oxide, barium oxide, titanium oxide, aluminum oxide, or zinc oxide, silica, or a layered silicate mineral. The filler preferably has an average particle size of 0.1 to 80 μm. The average particle size is the value measured by layer diffraction/scattering method. The filler may also be surface-treated with a silane coupling agent or the like, or granulated with a binder such as an epoxy, urethane, or acrylic type binder to form granules. For example, the heat stabilizer may be a hindered phenol, a phosphorus compound, a hindered amine, a sulfur compound, a copper compound, an alkali metal halide, or any mixture thereof. For example, the filling material may be an inorganic filling material such as talc, calcium carbonate, silica, alumina, magnesium oxide, or glass fibers, or an organic filling material such as a natural material such as starch, cellulose fine particles, wood flour, bean curd refuse (okara), chaff, or kenaf, or modifications thereof, or synthetic organic fibers typified by polyamide or polyarylate fibers. The crystal nucleating agent may be an inorganic crystal nucleating agent such as talc or kaolin or an organic crystal nucleating agent such as a sorbitol compound, benzoic acid, and a metal salt of the compound, or a rosin compound. In the present embodiment, while the components of the substrate and the content of each component are not restricted, the weight content of a plant-derived component (s) in the substrate is preferably from 25% by weight to 100% by weight, and this content is more preferably from 40% by weight to 90% by weight, because in such a case, not only environmental loading can be reduced, but also satisfactory performance can be achieved for electronic equipment cases. If the weight content of a plant-derived component (s) is less than 25% by weight, a reduction in environmental loading, an object of the present disclosure, may be difficult to achieve.

While the method for producing the substrate is not restricted, for example, the substrate can be produced using a melting-kneading machine such as a single screw extruder or a twin screw extruder. The kneading method is also not restricted, and for example, all the raw materials may be melted and kneaded at a time, or some of the raw materials may be previously kneaded and then mixed with the remaining raw materials and melded and kneaded together. As long as the effects of the present disclosure are not impaired, a pigment, a plasticizer, a lubricant, an antioxidant, a heat stabilizer, a release agent, a flame retardant, an anti-hydrolysis agent, or the like may also be added. The flame retardant to be used may be a known flame retardant such as a metal hydrate such as aluminum hydroxide or magnesium hydroxide, any of various phosphorus-based flame retardants such as phosphoric acid esters and phosphazene compounds, a carbonization accelerator such as phenolic resin, or an anti-dripping agent such as polytetrafluoroethylene.

Examples of the substrate molding method include, but are not limited to, injection molding, extrusion molding, inflation molding, transfer molding, and press molding.

In the polylactic acid-based decorative body according to the present embodiment, the adhesion layer preferably contains a polylactic acid resin, a naturally-occurring tackifying resin, an anti-hydrolysis agent, and a polyfunctional isocyanate as coating components. Besides them, the adhesion layer may also contain at least one of a pigment, an inorganic filler, and a glitter.

The polylactic acid resin contained as a part of the coating components of the adhesion layer is a resin composed mainly of polylactic acid. In the present embodiment, poly-L-lactic acid, poly-D-lactic acid, or a mixture or copolymer thereof is preferably used as a component of the polylactic acid resin, while the components of the polylactic acid resin are not restricted. The polylactic acid resin preferably has a hydroxyl value of 1 to 50 mgKOH/g. If it is less than 1 mgKOH/g, the resulting crosslink density of urethane bond may be insufficient, so that water resistance or chemical resistance may be reduced. If it is more than 50 mgKOH/g, the crosslink density of urethane bond may be excessive, so that the coating film may be excessively cured and shrunk and thus reduced in adhesion to the substrate.

The polylactic acid resin contained as a part of the coating components of the adhesion layer preferably has a polystyrene-equivalent weight average molecular weight Mw of 2,000 to 70,000. If it is less than 2,000, the coating film may have insufficient strength, and if it is more than 70,000, the coating composition may have too high viscosity, so that thick application of the coating composition may be difficult, which may reduce workability and make it difficult to obtain a smooth coating film.

For example, the naturally-occurring tackifying resin may be a terpene-based resin or a rosin-based resin. Examples of the terpene-based resin include a terpene resin, a terpene phenolic resin, a hydrogenated terpene resin, and an aromatic modified terpene resin. Examples of the rosin-based resin include rosin, polymerized rosin, hydrogenated rosin, a rosin ester, a hydrogenated rosin ester, and a rosin-modified phenolic resin. Among them, a terpene phenolic resin is more preferred. A single naturally-occurring tackifying resin may be used alone, or two or more naturally-occurring tackifying resins may be used in combination. The content of the naturally-occurring tackifying resin is preferably from 1 to 100% by weight, based on 100% by weight of the polylactic acid resin. In particular, it is preferably from 20 to 60% by weight. If it is less than 1% by weight, adhesion to the substrate may be insufficient, and if it is more than 100% by weight, the coating composition may be highly sticky, which may make handling difficult and reduce the strength of the coating film.

The anti-hydrolysis agent prevents the hydrolysis of the polylactic acid resin and imparts durability to the adhesion layer or the polylactic acid resin-containing substrate. For example, a substance, such as a carbodiimide compound, an oxazoline compound, or an epoxy compound, that is generally effective in inhibiting hydrolysis of ester resins such as polylactic acid resins can be used as the anti-hydrolysis agent. Among them, a carbodiimide compound is more preferred. The content of the anti-hydrolysis agent is preferably from 0.1 to 5% by weight, based on 100% by weight of the polylactic acid resin. In particular, it is preferably from 1 to 5% by weight. If it is less than 0.1% by weight, sufficient hydrolysis resistance may not be produced, and if it is more than 5% by weight, the polylactic acid resin as a component of the adhesion layer may increase in molecular weight and increase in viscosity, so that the wettability between the adhesion layer and the substrate may significantly decrease.

The polyfunctional isocyanate acts as a crosslinking agent. Examples of the polyfunctional isocyanate include aliphatic polyfunctional isocyanate compounds such as hexamethylene diisocyanate, dicyclohexylmethane 4,4'-isocyanate, 2,2,4-trimethylhexylmethane diisocyanate, and isophorone diisocyanate; and aromatic polyfunctional isocyanate compounds such as tolylene diisocyanate, xylylene diisocyanate, diphenylmethane diisocyanate, methylcyclohexane diisocyanate, and polymethylene polyphenyl polyisocyanate. In the present embodiment, aliphatic polyfunctional isocyanate compounds are preferred. In particular, hexamethylene diisocyanate and isophorone diisocyanate are preferred. The content of the polyfunctional isocyanate is preferably from 20 to 80% by weight, based on 100% by weight of the polylactic acid resin. In particular, it is preferably from 30 to 50% by weight. If it is less than 20% by weight, sufficient coating durability may not be obtained, and hydrophobicity may be low so that the water resistance of the polylactic acid-based decorative body may be insufficient. If it is more than 80% by weight, adhesion to the substrate may decrease.

A known pigment, a known inorganic filler, or a known glitter may be used. For example, the pigment may be an organic pigment such as an azo compound, indanthrene, thioindigo, dioxazine, quinacridone, or phthalocyanine; or an inorganic pigment such as titanium oxide, red iron oxide, or carbon black. For example, the inorganic filler may be a metal oxide such as magnesium oxide, barium oxide, titanium oxide, aluminum oxide, or zinc oxide, silica, or a layered silicate mineral. For example, the glitter may be aluminum flakes, pearl mica, or glass flakes. The pigment, the inorganic filler, or the glitter may be used alone, or two or more of them may be used in combination. In the present embodiment, the pigment, the inorganic filler, or the glitter may be added in any amount.

The weight content of a plant-derived component (s) in the coating components of the adhesion layer is preferably from 25% by weight to 100% by weight, and this content is more preferably from 50% by weight to 75% by weight, because in such a case, not only environmental loading can be reduced, but also satisfactory performance can be achieved for the adhesion layer. If it is less than 25% by weight, a reduction in environmental loading, an object of the present disclosure, may be difficult to achieve.

The adhesion layer is made of the coating components of an adhesion layer coating composition. The adhesion layer coating composition can be prepared by a process including: mixing a small amount of a liquid solvent with coating components including the polylactic acid resin, the naturally-occurring tackifying resin, the anti-hydrolysis agent, and the polyfunctional isocyanate, and optionally at least one additive selected from the pigment, the inorganic filler, or the glitter; and further adding a liquid solvent to the mixture so that the solids content and the viscosity are controlled to be suitable for application. As long as the effects of the present disclosure are not impaired, a plasticizer, a pigment dispersing agent, a curing catalyst, an ultraviolet absorbing agent, an emulsifying agent, a surface conditioner, a fluidity adjusting agent, or the like may also be added.

After prepared, the adhesion layer coating composition is applied onto the substrate within a predetermined time period. In the present embodiment, for example, the method for applying the adhesion layer coating composition may be selected from known coating methods such as roll coating, spray coating, dip coating, and brush coating. The adhesion layer is formed by a process including applying the adhesion layer coating composition to the substrate, drying the coating, and then curing the coating, which is however non-limiting in the present embodiment. Alternatively, for example, it may be formed by a process including applying the adhesion layer coating composition to the substrate, drying the coating, applying, onto the dried film, the functional layer coating composition described below, drying the coating, and then curing the adhesion layer and the functional layer at the same time. The adhesion layer preferably has a thickness of 15 to 50 μm, more preferably 20 to 30 μm. A thickness of less than 15 μm may make the layer ineffective, and a thickness of more than 50 μm may make workability poor and is not preferred economically. The desired thickness may be reached by a single application process or two or more application processes.

Known liquid media may be used. For example, organic solvents may be used, such as ketones such as diethyl ketone (3-pentanone), methyl propyl ketone (2-pentanone), methyl isobutyl ketone (4-methyl-2-pentanone), 2-hexanone, 5-methyl-2-hexanone, 2-heptanone, 3-heptanone, 4-heptanone, cyclopentanone, and cyclohexanone; esters such as ethyl acetate, isopropyl acetate, n-butyl acetate, isobutyl acetate, 3-methoxybutyl acetate, methyl propionate, ethyl propionate, diethyl carbonate, γ-butyrolactone, and isophorone; and hydrocarbons such as heptane, hexane, and cyclohexane. To further reduce environmental loading, a water-based medium may be used. The water-based medium is a mixture of water and a hydrophilic organic solvent. Examples of the hydrophilic organic solvent include alcohols such as methanol, ethanol, n-propanol, isopropanol, n-butanol, isobutanol, 1-ethyl-1-propanol, 2-methyl-1-butanol, n-hexanol, cyclohexanol, ethylene glycol monomethyl ether, ethylene glycol monoethyl ether, ethylene glycol monopropyl ether, and ethylene glycol monobutyl ether; ethers such as tetrahydrofuran and 1,4-dioxane; ketones such as acetone and methyl ethyl ketone; and esters such as methyl acetate, n-propyl acetate, isopropyl acetate, methyl propionate, ethyl propionate, and dimethyl carbonate. In the present embodiment, the type of the liquid solvent is not restricted, and a single liquid solvent may be used alone, or a mixture of two or more liquid solvents may be used. In view of the objects of the present disclosure, lower-environmental-loading solvents free of both toluene and xylene are preferably selected.

In the polylactic acid-based decorative body according to the present embodiment, the functional layer is a coating film formed by condensation reaction of OH groups in the acrylic resin as a component of the acrylic urethane coating composition with NCO groups in the polyfunctional isocyanate as another component of the acrylic urethane coating composition. When the molar ratio of the OH groups in the acrylic resin to the NCO groups in the polyfunctional isocyanate is 1:4 to 1:6, the functional layer can have increased coating performance and a good appearance, and its surface is not affected or deteriorated by sweat, a hand cream, or the like on the hand of the user even under wet conditions. If the amount of the NCO groups is less than 4 moles per 1 mole of the OH groups, the adhesion between the adhesion layer and the functional layer may be unstable, and if the amount of the NCO groups is more than 6 moles per 1 mole of the OH groups, the chemical resistance may be reduced.

In the polylactic acid-based decorative body, the acrylic urethane coating composition is preferably a synthetic resin coating composition containing an acrylic resin, a polyfunctional isocyanate, and a liquid solvent free of both toluene and xylene. The acrylic resin preferably contains hydroxyl groups. For example, the hydroxyl group-containing acrylic resin is an acrylic polyol having two or more hydroxyl groups per molecule, which is an acrylic copolymer produced using, as a copolymerizable monomer, a hydroxyl group-containing monoethylenic unsaturated monomer such as 2-hydroxyethyl (meth)acrylate, 2-hydroxypropyl (meth)acrylate, 2-hydroxybutyl (meth)acrylate, 4-hydroxybutyl (meth)acrylate, 2-hydroxyethyl vinyl ether, N-methylol(meth)acrylamide, or 4-hydroxystyrene-vinyltoluene. Preferred among them are 2-hydroxyethyl (meth)acrylate, 2-hydroxypropyl (meth) acrylate, 2-hydroxybutyl (meth)acrylate, and 4-hydroxybutyl (meth)acrylate. This is because they are highly reactive with the polyfunctional isocyanate and can produce a coating film with a good level of weather resistance, chemical resistance, and impact resistance. Particularly preferred are 2-hydroxyethyl (meth)acrylate and 2-hydroxypropyl (meth)acrylate. The polyfunctional isocyanate is preferably an aliphatic polyfunctional isocyanate compound. In particular, hexamethylene diisocyanate or isophorone diisocyanate is preferred. A known lower-environmental-loading solvent free of both toluene and xylene can be used as the liquid solvent, and a mixture of two or more solvents may be used as the liquid solvent.

The functional layer is made of the coating components of a functional layer coating composition, which is an acrylic urethane coating composition. The functional layer coating composition can be prepared by a process including: providing a mixture of an acrylic resin as a chief material and a small amount of a liquid solvent, providing a mixture of a polyfunctional isocyanate compound as a curing agent and a small amount of a liquid solvent, blending these mixtures in a certain ratio at the time of use, and further adding a liquid solvent to the blend so that the solids content is controlled to be suitable for application. As long as the effects of the present disclosure are not impaired, a coloring agent, a plasticizer, a pigment dispersing agent, an emulsifying agent, a fluidity adjusting agent, or the like may also be added. The same known liquid solvent as described above for the adhesion layer may be used as the liquid solvent for the functional layer.

After prepared, the functional layer coating composition is applied onto the adhesion layer within a predetermined time period. For example, the method for applying the functional layer coating composition may be selected from known coating methods such as roll coating, spray coating, dip coating, and brush coating. The functional layer is formed by a process including applying the functional layer coating composition onto the adhesion layer, drying the coating, and then curing the coating, which is however non-limiting in the present embodiment. As described above, it may also be formed by a process including applying the adhesion layer coating composition to the substrate, drying the coating, applying the functional layer coating composition to the dried film, drying the coating, and then curing the adhesion layer and the functional layer at the same time. The functional layer preferably has a thickness of 15 to 50 μm, more preferably 20 to 30 μm. A thickness of less than 15 μm may make the layer ineffective, and a thickness of more than 50 μm may make workability poor and is not preferred economically. The desired thickness may be reached by a single application process or two or more application processes. Two or more functional layers may also be provided.

EXAMPLES

Hereinafter, the present disclosure is described with reference to the examples, which however are not intended to limit the present disclosure.

Example 1

(1) Preparation of Substrate 1

Using a twin screw extruder (S1 KRC Kneader, manufactured by Kurimoto, Ltd.), 100 parts by weight of a polylactic acid resin (TERRAMAC TE-4000N, manufactured by UNITIKA LTD., 150,000 in polystyrene-equivalent weight average molecular weight Mw), 115.5 parts by weight of aluminum hydroxide as a flame retardant (HIGILITE HP-350, manufactured by SHOWA DENKO K.K.), 5 parts by weight of a phosphazene compound (sps-100, manufactured by Otsuka Chemical Co., Ltd.), 1 part by weigh of an anti-dripping agent (POLYFLON MPA, manufactured by DAIKIN INDUSTRIES, LTD), 2 parts by weight of an anti-hydrolysis agent (Stabaxol P, manufactured by Rhein Chemie Rheinau GmbH), 2 parts by weight of a crystal nucleating agent (ECOPROMOTE, manufactured by NISSAN CHEMICAL INDUSTRIES, LTD.), and 10 parts by weight of a plasticizer (DAIFATTY-101, manufactured by DAIHACHI CHEMICAL INDUSTRY CO., LTD.) were melted, kneaded, and extruded at 180° C. The discharged resin was cut into pellets, so that a polylactic acid resin composition was obtained. Subsequently, the polylactic acid resin composition pellet was used to form a test piece by means of an injection molding machine (EC20P, manufactured by TOSHIBA MACHINE CO., LTD.). At this time, the weight content of the plant-derived component in the substrate was 42.5% by weight.

(2) Preparation of Adhesion Layer Coating Composition

In a mixed solvent of 400 parts by weight of ethyl acetate and 400 parts by weight of cyclohexanone were dissolved 100 parts by weight of a polylactic acid resin (BE-400, manufactured by TOYOBO CO., LTD., 3 mgKOH/g in hydroxyl value, 43,000 in polystyrene-equivalent weight average molecular weight Mw), 30 parts by weight of terpene phenol (N-125, manufactured by YASUHARA CHEMICAL CO., LTD.), and 83 parts by weight of pigment black (ANP-L MA-100, manufactured by TOYO INK) (24.9 parts by weight of solids based on 100 parts by weight of the polylactic acid resin). To the solution were added 3 parts by weight of an aromatic carbodiimide (Elastostab H01, manufactured by Elastgran), 50 parts by weight of hexamethylene diisocyanate trimer (DURANATE TPA-100, manufactured by Asahi Kasei Corporation) as a polyfunctional isocyanate, and 0.1 parts by weight of dibutyltin didodecanoate (manufactured by Junsei Chemical Co., Ltd.), so that an adhesion layer coating composition was obtained, which had a solids content of 19.5%. The weight content of the plant-derived component in the coating components was 48.5% by weight.

(3) Formation of Adhesion Layer

The adhesion layer coating composition was applied to the substrate so that a 20 μm thick coating could be formed after drying, and the coating was dried at 70° C. for 30 minutes and aged at room temperature for 72 hours to form an adhesion layer.

(4) Preparation of Functional Layer Coating Composition

A two liquid-type acrylic urethane coating composition (Econet FX Silver, manufactured by Origin ELECTRIC CO., LTD.) was used as a functional layer coating composition. Econet FX Silver is a TX-free (toluene and xylene-free) coating composition. The preparation method was as follows. One hundred parts by weight of a chief material (containing an acrylic resin and a pigment as main solid components) was dissolved in 200 parts by weight of ethyl acetate, 200 parts by weight of butyl acetate, and 500 parts by weight of diisobutyl ketone, and 22.2 parts by weight of a curing agent (containing a polyfunctional isocyanate compound as a main component) was added to the solution. At this time, in the functional layer coating composition, the molar ratio of the OH groups in the acrylic resin to the NCO groups in the polyfunctional isocyanate compound was 1:4.

(5) Formation of Functional Layer

The functional layer coating composition was applied onto the aged adhesion layer on the substrate so that a 20 μm thick coating could be formed after drying, and the coating was dried at 70° C. for 30 minutes and aged at room temperature for 72 hours to form a functional layer, so that a polylactic acid-based decorative body was obtained.

Example 2

A polylactic acid-based decorative body was prepared according to Example 1, except that in the functional layer coating composition, the amount of the curing agent was 27.8 parts by weight, based on 100 parts by weight of the chief material. In the functional layer coating composition, the molar ratio of the OH groups in the acrylic resin to the NCO groups in the polyfunctional isocyanate compound was 1:5.

Example 3

A polylactic acid-based decorative body was prepared according to Example 1, except that in the functional layer coating composition, the amount of the curing agent was 33.3 parts by weight, based on 100 parts by weight of the chief material. In the functional layer coating composition, the molar ratio of the OH groups in the acrylic resin to the NCO groups in the polyfunctional isocyanate compound was 1:6.

Example 4

A polylactic acid-based decorative body was prepared according to Example 1, except that the composition was applied so that a 15 μm thick functional layer could be formed after drying.

Example 5

A polylactic acid-based decorative body was prepared according to Example 1, except that substrate 2 was used in place of substrate 1. Substrate 2 was prepared as described below. Using a twin screw extruder (S1 KRC Kneader, manufactured by Kurimoto, Ltd.), 60 parts by weight of a polylactic acid resin (TERRAMAC TE-4000N, manufactured by UNITIKA LTD., 150,000 in polystyrene-equivalent weight average molecular weight Mw), 40 parts by weight of polycaprolactone (PLACCEL H1P, manufactured by Daicel Corporation), 115.5 parts by weight of aluminum hydroxide as a flame retardant (HIGILITE HP-350, manufactured by SHOWA DENKO K.K.), 5 parts by weight of a phosphazene compound (sps-100, manufactured by Otsuka Chemical Co., Ltd.), 1 part by weigh of an anti-dripping agent (POLYFLON MPA, manufactured by DAIKIN INDUSTRIES, LTD), 2 parts by weight of an anti-hydrolysis agent (Stabaxol P, manufactured by Rhein Chemie Rheinau GmbH), 2 parts by weight of a crystal nucleating agent (ECOPROMOTE, manufactured by NISSAN CHEMICAL INDUSTRIES, LTD.), and 10 parts by weight of a plasticizer (DAIFATTY-101, manufactured by DAIHACHI CHEMICAL INDUSTRY CO., LTD.) were melted, kneaded, and extruded at 180° C. The discharged resin was cut into pellets, so that a polylactic acid resin composition was obtained. Subsequently, the polylactic acid resin composition pellet was used to form a test piece by means of an injection molding machine (EC20P, manufactured by TOSHIBA MACHINE CO., LTD.). At this time, the weight content of the plant-derived component in the substrate was 25.5% by weight.

Example 6

A polylactic acid-based decorative body was prepared according to Example 1, except that substrate 3 was used in place of substrate 1. Substrate 3 was prepared as described below. Using a twin screw extruder (S1 KRC Kneader, manufactured by Kurimoto, Ltd.), 100 parts by weight of a polylactic acid resin (TERRAMAC TE-4000N, manufactured by UNITIKA LTD., 150,000 in polystyrene-equivalent weight average molecular weight Mw), 2 parts by weight of an anti-hydrolysis agent (Stabaxol P, manufactured by Rhein Chemie Rheinau GmbH), 2 parts by weight of a crystal nucleating agent (ECOPROMOTE, manufactured by NISSAN CHEMICAL INDUSTRIES, LTD.), 10 parts by weight of a plasticizer (DAIFATTY-101, manufactured by DAIHACHI CHEMICAL INDUSTRY CO., LTD.), and 10 parts by weight of glass fibers (CS03JAFT592, manufactured by ASAHI FIBERGLASS Co., Ltd., 3 mm in fiber length) were melted, kneaded, and extruded at 180° C. The discharged resin was cut into pellets, so that a polylactic acid resin composition was obtained. Subsequently, the polylactic acid resin composition pellet was used to form a test piece by means of an injection molding machine (EC20P, manufactured by TOSHIBA MACHINE CO., LTD.). At this time, the weight content of the plant-derived component in the substrate was 80.6% by weight.

Example 7

A polylactic acid-based decorative body was prepared according to Example 1, except that substrate 4 was used in place of substrate 1. Substrate 4 was prepared as described below. Using a twin screw extruder (S1 KRC Kneader, manufactured by Kurimoto, Ltd.), 100 parts by weight of a polylactic acid resin (TERRAMAC TE-4000N, manufactured by UNITIKA LTD., 150,000 in polystyrene-equivalent weight average molecular weight Mw), 2 parts by weight of an anti-hydrolysis agent (Stabaxol P, manufactured by Rhein Chemie Rheinau GmbH), 2 parts by weight of a crystal nucleating agent (ECOPROMOTE, manufactured by NISSAN CHEMICAL INDUSTRIES, LTD.), and 7.5 parts by weight of a plasticizer (DAIFATTY-101, manufactured by DAIHACHI CHEMICAL INDUSTRY CO., LTD.) were melted, kneaded, and extruded at 180° C. The discharged resin was cut into pellets, so that a polylactic acid resin composition was obtained. Subsequently, the polylactic acid resin composition pellet was used to form a test piece by means of an injection molding machine (EC20P, manufactured by TOSHIBA MACHINE CO., LTD.). At this time, the weight content of the plant-derived component in the substrate was 89.7% by weight.

Example 8

A polylactic acid-based decorative body was prepared according to Example 1, except that substrate 5 was used in place of substrate 1. Substrate 5 was prepared as described below. Using a twin screw extruder (S1 KRC Kneader, manufactured by Kurimoto, Ltd.), only 100 parts by weight of a polylactic acid resin for the substrate was melted, kneaded, and extruded at 180° C. The discharged resin was cut into pellets, so that a polylactic acid resin composition was obtained. Subsequently, the polylactic acid resin composition pellet was used to form a test piece by means of an injection molding machine (EC20P, manufactured by TOSHIBA MACHINE CO., LTD.). At this time, the weight content of the plant-derived component in the substrate was 100% by weight.

Comparative Example 1

A polylactic acid-based decorative body was prepared according to Example 1, except that in the functional layer coating composition, the amount of the curing agent was 11.1 parts by weight, based on 100 parts by weight of the chief material. In the functional layer coating composition, the molar ratio of the OH groups in the acrylic resin to the NCO groups in the polyfunctional isocyanate compound was 1:2.

Comparative Example 2

A polylactic acid-based decorative body was prepared according to Example 1, except that in the functional layer coating composition, the amount of the curing agent was 16.7 parts by weight, based on 100 parts by weight of the chief material. In the functional layer coating composition, the molar ratio of the OH groups in the acrylic resin to the NCO groups in the polyfunctional isocyanate compound was 1:3.

Comparative Example 3

A polylactic acid-based decorative body was prepared according to Example 1, except that a two liquid-type acrylic urethane coating composition (Planet PX-1 Silver, manufactured by Origin ELECTRIC CO., LTD.) was used as the functional layer coating composition. Planet PX-1 Silver is a general-purpose coating composition for plastics. The preparation method was as follows. One hundred parts by weight of a chief material (containing an acrylic resin and a pigment as main solid components) was dissolved in 200 parts by weight of toluene, 200 parts by weight of xylene, and 200 parts by weight of diisobutyl ketone, and 28 parts by weight of a curing agent (containing a polyfunctional isocyanate compound as a main solid) was added to the solution. In the functional layer coating composition, the molar ratio of the OH groups in the acrylic resin to the NCO groups in the polyfunctional isocyanate compound was 1:3.

Comparative Example 4

A polylactic acid-based decorative body was prepared according to Example 1, except that in the functional layer coating composition, the amount of the curing agent was 38.9 parts by weight, based on 100 parts by weight of the chief material. In the functional layer coating composition, the molar ratio of the OH groups in the acrylic resin to the NCO groups in the polyfunctional isocyanate compound was 1:7.

Comparative Example 5

A polylactic acid-based decorative body was prepared according to Example 1, except that the functional layer was not provided.

Comparative Example 6

A polylactic acid-based decorative body was prepared according to Example 1, except that the adhesion layer was not provided.

The measurement methods used in the evaluation of the polylactic acid-based decorative bodies of the examples and the comparative examples are shown below.

(1) 1 mm Cross-Cut Tape Adhesion Test

According to JIS K 5600-5-6:1999 "Cross-Cut Method," 100 cross-cuts of 1 mm×1 mm were formed and subjected to the adhesive tape peel test. The evaluation was performed according to the same evaluation criteria as in the standard.
0: (practically acceptable level)
1-5: (practically unacceptable)

(2) Pencil Scratch Test

According to JIS K 5600-5-4:1999 "Scratch Hardness: Pencil Method," the test was performed, and evaluation was made using the highest pencil hardness at which no scratch was formed.

(3) Artificial Sweat Test

Cross-cuts were made on the surface of the coating film of the polylactic acid-based decorative body, which was then immersed in artificial sweat (acid or basic) at 25° C. for 48 hours. Thereafter, the decorative body was washed with tap water and air-dried. It was observed whether the appearance of the coating film changed before and after the test, and evaluation was made according to the criteria shown below. The artificial sweat was prepared according to JIS L 0848: 2004. Specifically, acid artificial sweat was prepared by a process including dissolving 0.5 g of L-histidine hydrochloride monohydrate, 5 g of sodium chloride, and 2.2 g of sodium dihydrogen phosphate dihydrate in water and adding, to the solution, about 15 ml of a 0.1 mol/l sodium hydroxide solution and water so that a pH of 5.5 and a total volume of about 1 l could be obtained. Basic artificial sweat was prepared by a process including dissolving 0.5 g of L-histidine hydrochloride monohydrate, 5 g of sodium chloride, and 5 g of disodium hydrogen phosphate 12 hydrate in water and adding, to the solution, about 25 ml of a 0.1 mol/l sodium hydroxide solution and water so that a pH of 8.0 and a total volume of about 1 l could be obtained.
○: There was no anomaly (practically acceptable level).
x: There was an anomaly (practically unacceptable).

(4) Tape Adhesion Test after the Artificial Sweat Test

After the artificial sweat test, a tape adhesion test was performed on the cross-cut part. The method and evaluation for the tape adhesion test were as follows. After an adhesive tape was bonded to the coating film surface of the polylactic acid-based decorative body, the tape was peeled off, and the state of the coating film surface was evaluated according to the criteria shown below. The conditions of the adhesive tape used were the same as those in the (1) 1 mm Cross-Cut Tape Adhesion Test.
○: There was no anomaly (practically acceptable level).
x: There was an anomaly (practically unacceptable).

(5) Chemical Resistance Test

Cross-cuts were made on the surface of the coating film of the polylactic acid-based decorative body, and a commercially available hand cream (Atrix (trade name), manufactured by Kao Corporation) was applied to the surface. The decorative body was allowed to stand at 60° C. and 95% RH for 2 hours and then subjected to a three-cycle test in which the decorative body was allowed to stand at −20° C. for 2 hours in one cycle. It was observed whether the appearance of the coating film changed before and after the test, and evaluation was made according to the criteria shown below.
○: There was no anomaly (practically acceptable level).
x: Discoloration of the coating film was observed (practically unacceptable).

(6) Tape Adhesion Test after the Chemical Resistance Test

After the chemical resistance test, a tape adhesion test was performed on the cross-cut part. The method and evaluation method of the tape adhesion test were the same as those in the tape adhesion test after the artificial sweat test.

(7) Warm Water Test

The polylactic acid-based decorative body was placed in a vessel containing tap water. The amount of tap water was such that the whole of the polylactic acid-based decorative body was immersed in it. The vessel (in which the decorative body was immersed in tap water) was placed in a thermostatic chamber. Subsequently, the temperature in the thermostatic chamber was set at 60° C., and the decorative body was allowed to stand in the chamber for 24 hours. Thereafter, the decorative body was taken out of the warm water, and the warm water was wiped off the surface of the decorative body. Subsequently, it was observed whether the appearance of the coating film changed, and evaluation was made according to the criteria shown below.
○: There was no change (practically acceptable level).
Δ: Swelling of the coating film was observed (practically unacceptable).
x: The coating film deteriorated (practically unacceptable).

TABLE 1

| | Polylactic acid-based decorative body | | | | |
| --- | --- | --- | --- | --- | --- |
| | Content [wt %] of plant-derived component in substrate | OH group:NCO group in functional layer | Remarks | 1 mm cross-cut tape adhesion test | Pencil scratch test |
| Example 1 | 42.5 | 1:4 | | 0 | F |
| Example 2 | 42.5 | 1:5 | | 0 | F |
| Example 3 | 42.5 | 1:6 | | 0 | F |
| Example 4 | 42.5 | 1:4 | The functional layer is 15 μm thick. | 0 | F |
| Example 5 | 25.5 | 1:4 | The content of the plant-derived component in the substrate is the lower limit. | 0 | F |
| Example 6 | 80.6 | 1:4 | | 0 | F |
| Example 7 | 89.7 | 1:4 | | 0 | F |
| Example 8 | 100 | 1:4 | The substrate is entirely composed of the plant-derived component. | 0 | F |
| Comparative Example 1 | 42.5 | 1:2 | | 0 | F |
| Comparative | 42.5 | 1:3 | | 0 | F |

TABLE 1-continued

| | | | | | |
|---|---|---|---|---|---|
| Example 2 | | | | | |
| Comparative Example 3 | 42.5 | 1:3 | Planet PX is used as the functional layer coating composition. | 1 | F |
| Comparative Example 4 | 42.5 | 1:7 | The amount of the NCO groups per 1 mol of the OH groups in the functional layer is the upper limit. | 0 | H |
| Comparative Example 5 | 42.5 | — | No functional layer | 1 | F |
| Comparative Example 6 | 42.5 | 1:4 | No adhesion layer | 3 | F |

| | Artificial sweat test | | Tape adhesion test after artificial sweat test | | Chemical resistance test (Atrix) | Tape adhesion test after chemical resistance test (Atrix) | Warm water test |
|---|---|---|---|---|---|---|---|
| | Acid | Basic | Acid | Basic | | | |
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | ○ | ○ | ○ | ○ | ○ | ○ |
| Example 5 | ○ | ○ | ○ | ○ | ○ | ○ | ○ |
| Example 6 | ○ | ○ | ○ | ○ | ○ | ○ | ○ |
| Example 7 | ○ | ○ | ○ | ○ | ○ | ○ | ○ |
| Example 8 | ○ | ○ | ○ | ○ | ○ | ○ | ○ |
| Comparative Example 1 | ○ | ○ | ○ | ○ | ○ | ○ | Δ |
| Comparative Example 2 | ○ | ○ | ○ | ○ | ○ | ○ | Δ |
| Comparative Example 3 | ○ | ○ | ○ | X | ○ | ○ | Δ |
| Comparative Example 4 | ○ | ○ | ○ | ○ | X | ○ | ○ |
| Comparative Example 5 | ○ | ○ | ○ | X | X | ○ | X |
| Comparative Example 6 | ○ | ○ | X | X | ○ | X | Δ |

The various evaluation results are summarized in Table 1. As compared with Comparative Examples 1 to 6, the polylactic acid-based decorative bodies of Examples 1 to 8 all have good adhesion between the substrate and the adhesion layer and the functional layer, high chemical resistance, and high water resistance, and show good results. In all of Examples 1 to 8, neither toluene nor xylene is used as a solvent in forming the functional layer, which is preferred in view of the objects of the present disclosure.

It is considered that since in Comparative Examples 1, 2, and 3, the coating film had low hydrophobicity and the polylactic acid-based decorative body had insufficient water resistance, swelling was observed between the adhesion layer and the functional layer under warm water due to the reduction of the coating strength and the adhesion of the adhesion layer and the functional layer. In Comparative Example 4, since the added amount of the curing agent is excessive relative to that of the chief material in the functional layer (OH group:NCO group=1:7), the crosslinked resin structure formed by reaction of the chief material with the curing agent has a low density, and the functional layer has a glass transition temperature (Tg) lower than that in the examples. It has been concluded that under this influence, the chemical resistance was reduced so that hand cream-induced discoloration of the coating film was observed in Comparative Example 4. It is considered that in Comparative Example 5 where no functional layer was provided, the polylactic acid resin of the exposed adhesion layer underwent hydrolysis so that the chemical resistance and the water resistance deteriorated. It is considered that in Comparative Example 6 where the functional layer was formed directly on the substrate by coating with no adhesion layer, the adhesion between the substrate and the functional layer was low, so that all performance capabilities were inferior to those of the examples.

What is claimed is:

1. A polylactic acid-based decorative body, comprising:
a polylactic acid resin-containing substrate;
a polylactic acid resin-containing adhesion layer provided on the substrate; and
at least one functional layer that is formed on the adhesion layer by applying an acrylic urethane coating composition, wherein
the acrylic urethane coating composition forms a coating film by causing a condensation reaction of an acrylic resin with a polyfunctional isocyanate, and
the molar ratio of OH groups in the acrylic resin to NCO groups in the polyfunctional isocyanate is 1:4 to 1:6.

2. The polylactic acid-based decorative body according to claim 1, wherein the acrylic urethane coating composition is a synthetic resin coating composition comprising an acrylic resin, a polyfunctional isocyanate, and a liquid solvent free of both toluene and xylene.

3. The polylactic acid-based decorative body according to claim 1, wherein the adhesion layer comprises a polylactic acid resin, a naturally-occurring tackifying resin, an antihydrolysis agent, and a polyfunctional isocyanate as coating components.

4. The polylactic acid-based decorative body according to claim 1, wherein the adhesion layer contains at least one of a pigment, an inorganic filler, and a glitter.

5. The polylactic acid-based decorative body according to claim 1, wherein the weight content of a plant-derived component in the substrate is from 25% by weight to 100% by weight.

\* \* \* \* \*